US010652984B2

(12) United States Patent
Boivin (10) Patent No.: US 10,652,984 B2
(45) Date of Patent: May 12, 2020

(54) LIGHT EMITTING GIFT WRAPPING APPARATUS

(71) Applicant: INSTITUT NATIONAL D'OPTIQUE, Québec (CA)

(72) Inventor: Philippe Boivin, Québec (CA)

(73) Assignee: INSTITUT NATIONAL D'OPTIQUE, Québec (CA)

( * ) Notice: Subject to any disclaimer, the term of this patent is extended or adjusted under 35 U.S.C. 154(b) by 0 days.

(21) Appl. No.: 16/287,111

(22) Filed: Feb. 27, 2019

(65) Prior Publication Data

US 2019/0274202 A1 Sep. 5, 2019

Related U.S. Application Data

(60) Provisional application No. 62/637,545, filed on Mar. 2, 2018.

(51) Int. Cl.
| | |
|---|---|
| H05B 33/00 | (2006.01) |
| H05B 45/00 | (2020.01) |
| F21S 9/03 | (2006.01) |
| F21V 23/04 | (2006.01) |
| B65D 65/22 | (2006.01) |
| B65D 65/04 | (2006.01) |
| B65D 65/10 | (2006.01) |
| F21Y 115/15 | (2016.01) |
| H05B 47/19 | (2020.01) |

(52) U.S. Cl.
CPC ............. *H05B 45/60* (2020.01); *B65D 65/04* (2013.01); *B65D 65/10* (2013.01); *B65D 65/22* (2013.01); *F21S 9/035* (2013.01); *F21V 23/04* (2013.01); *B65D 2203/12* (2013.01); *F21Y 2115/15* (2016.08); *H05B 47/19* (2020.01)

(58) Field of Classification Search
CPC .... B41C 1/003; B41C 1/182; G03G 15/0131; G03G 15/0189; G03G 15/1605; G03G 15/1665; G03G 15/1675; G03G 15/556; G03G 15/6585
See application file for complete search history.

(56) References Cited

U.S. PATENT DOCUMENTS

| | | |
|---|---|---|
| 5,980,062 A | 11/1999 | Bell |
| 6,020,823 A | 2/2000 | DeCicco |
| 6,568,828 B2 | 5/2003 | Rudoy |
| 6,573,880 B1 | 6/2003 | Simoni et al. |
| 6,637,906 B2 | 10/2003 | Knoerzer et al. |
| 7,813,025 B2 | 10/2010 | Ribi |
| 8,907,560 B2 | 12/2014 | Levermore et al. |
| 9,356,152 B2 | 5/2016 | Isa et al. |
| 9,559,314 B2 | 1/2017 | Rajan et al. |
| 2004/0264179 A1 | 12/2004 | Clark |
| 2009/0314677 A1 | 12/2009 | Teggatz et al. |

(Continued)

*Primary Examiner* — Monica C King
(74) *Attorney, Agent, or Firm* — Norton Rose Fulbright Canada LLP; Reno Lessard (57) ABSTRACT

There is described a gift wrapping apparatus having a sheet of material being foldable by hand, a plurality of light emitting elements made integral to the sheet, the plurality of light emitting elements having power receiving conductors, and a plurality of conductive traces made integral to the sheet and forming a powering circuit connecting the power receiving conductors of the light emitting elements to at least a positive terminal and a negative terminal.

20 Claims, 9 Drawing Sheets

(56) References Cited

U.S. PATENT DOCUMENTS

| | | |
|---|---|---|
| 2012/0201047 A1 | 8/2012 | Sherman et al. |
| 2012/0286302 A1 | 11/2012 | Mandlik et al. |
| 2013/0044487 A1 | 2/2013 | Burrows et al. |
| 2015/0015573 A1 | 1/2015 | Burtzlaff et al. |
| 2016/0004158 A1 | 1/2016 | Chen et al. |
| 2016/0041581 A1 | 2/2016 | Piccionelli et al. |
| 2017/0001774 A1 | 1/2017 | West |
| 2020/0008299 A1* | 1/2020 | Tran .................. H05K 1/0393 |

* cited by examiner

LIGHT EMITTING GIFT WRAPPING APPARATUS

FIELD

The improvements generally relate to the field of wrapping apparatuses for wrapping a gift, and more specifically relate to light emitting wrapping apparatuses.

BACKGROUND

Gift wrapping generally refers to enveloping a gift with some kind of wrapping paper. Such wrapping paper is typically provided in the form of a sheet of material on which decorative patterns are imprinted. Although the existing wrapping paper is satisfactory to a certain degree, there remains room for improvement.

SUMMARY

There is described a gift wrapping apparatus having a sheet of material which is foldable by hand, light emitting elements made integral to the sheet, and conductive traces made integral to the sheet so that they can relay power between a power source and the light emitting elements. In this way, a gift wrapped with the gift wrapping apparatus can be lighted as desired to provide an eye-catching look. In an embodiment, the light emitting elements are organic light emitting diode (OLED) elements, which can be made integral to the sheet using printable electronics techniques and/or hybrid circuits fabrication methods.

In accordance with one aspect, there is provided a gift wrapping apparatus comprising: a sheet of material being foldable by hand; a plurality of light emitting elements made integral to the sheet, the plurality of light emitting elements having power receiving conductors; and a plurality of conductive traces made integral to the sheet and forming a powering circuit connecting the power receiving conductors of the light emitting elements to at least a positive terminal and a negative terminal.

In accordance with another aspect, there is provided a method of using a gift wrapping apparatus having a sheet of material being foldable by hand, a plurality of light emitting elements made integral to the sheet, and a powering circuit allowing powering the plurality of light emitting elements, the method comprising: wrapping a gift with the gift wrapping apparatus; and powering the powering circuit thereby turning on at least some of the plurality of light emitting elements.

It will be noted that the meaning of the term "print" is to be interpreted broadly so as to encompass any type of process of applying a given material onto a sheet of another material and to perform annealing of such given material forming a solid material. Annealing is to be interpreted broadly so as to encompass any type of transformation applied to the given material such as curing, sintering and the like. Such transformation may involve illuminating the given material using light (e.g., ultra-violet light, near-infrared light), baking the given material in an oven, and other suitable transformation. For instance, such printing can include impressing the given material onto the sheet, depositing the material onto the sheet and/or stamping the material onto the sheet. Moreover, the components which are printed onto the sheet may be printed using existing printable electronics techniques and/or hybrid circuits fabrication methods.

It will be understood that the expression "computer" as used herein is not to be interpreted in a limiting manner. It is rather used in a broad sense to generally refer to the combination of some form of one or more processing units and some form of memory system accessible by the processing unit(s). Similarly, the expression "controller" as used herein is not to be interpreted in a limiting manner but rather in a general sense of a device, or of a system having more than one device, performing the function(s) of controlling one or more devices such as an electronic device or an actuator, for instance.

It will be understood that the various functions of a computer or of a controller can be performed by hardware or by a combination of both hardware and software. For example, hardware can include logic gates included as part of a silicon chip of the processor. Software can be in the form of data such as computer-readable instructions stored in the memory system. With respect to a computer, a controller, a processing unit, or a processor chip, the expression "configured to" relates to the presence of hardware or a combination of hardware and software which is operable to perform the associated functions.

Many further features and combinations thereof concerning the present improvements will appear to those skilled in the art following a reading of the instant disclosure.

DESCRIPTION OF THE FIGURES

In the figures.

DETAILED DESCRIPTION

Figure 1:
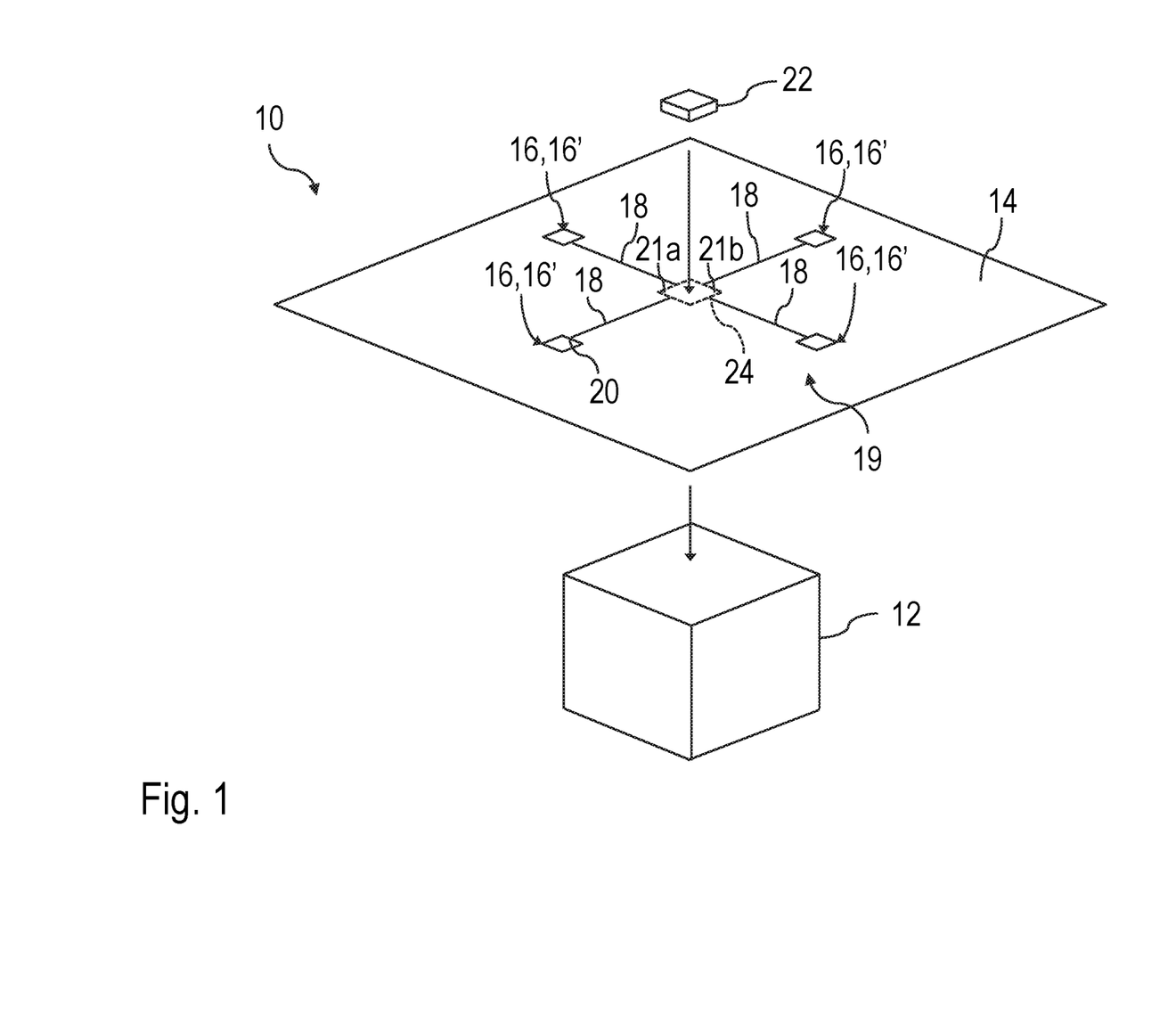
FIG. 1 is an exploded view of an example of a gift wrapping apparatus, in an unwrapped configuration, in accordance with an embodiment.

FIG. 1 shows an example of a gift wrapping apparatus 10 for wrapping a gift 12, in an unwrapped configuration. As depicted, the gift wrapping apparatus 10 has a sheet 14 of material which is foldable by hand. Examples of the material of the sheet 14 can include metal foil, plastic, fabric, paper or any combinations thereof. Accordingly, the sheet 14 of material can thus be used to conveniently wrap the gift 12 for decorative purposes.

As illustrated, the gift wrapping apparatus 10 has light emitting elements 16 which are made integral to the sheet 14, and conductive traces 18 which are also made integral to the sheet 14. More specifically, in this specific embodiment, the light emitting elements 16 and the conductive traces 18 are printed onto the sheet 14.

As shown, the conductive traces 18 form a powering circuit 19 connecting power receiving conductors 20 of the light emitting elements 16 to at least a positive terminal 21*a* and a negative terminal 21*b*.

When a power source 22 is connected to the positive terminal 21*a* and the negative terminal 21*b* of the powering circuit 19, power can be supplied to the light emitting elements 16 via the conductive traces 18. In this way, when powered, the light emitting elements 16 can light the surrounding environment and provide a desirable visual effect to the gift 12 wrapped with the gift wrapping apparatus 10.

In the illustrated embodiment, the light emitting elements 16 are provided in the form of organic light emitting diode (OLED) elements 16' which are adapted to light in one or more colors. However, it will be understood that the light emitting elements 16 can be any other printable light emitting elements.

In this embodiment, the power source 22 is removably connectable to the positive and negative terminals 21*a* and 21*b* of the powering circuit 19. Accordingly, the power source 22 can be replaced with another power source, or recharged, when the power provided by the power source 22 is insufficient. Examples of the power source 22 can include a rechargeable battery, a disposable battery (e.g., an alkaline battery), and/or a battery pack.

As shown in this embodiment, the positive and negative terminals 21*a* and 21*b* of the powering circuit 19 are parts of a power source holder 24 which is mounted to the sheet 14. In this way, the power source 22 can be received in the power source holder 24 to provide a satisfactory connection between the power source 22 and the powering circuit 19.

Figure 2A:
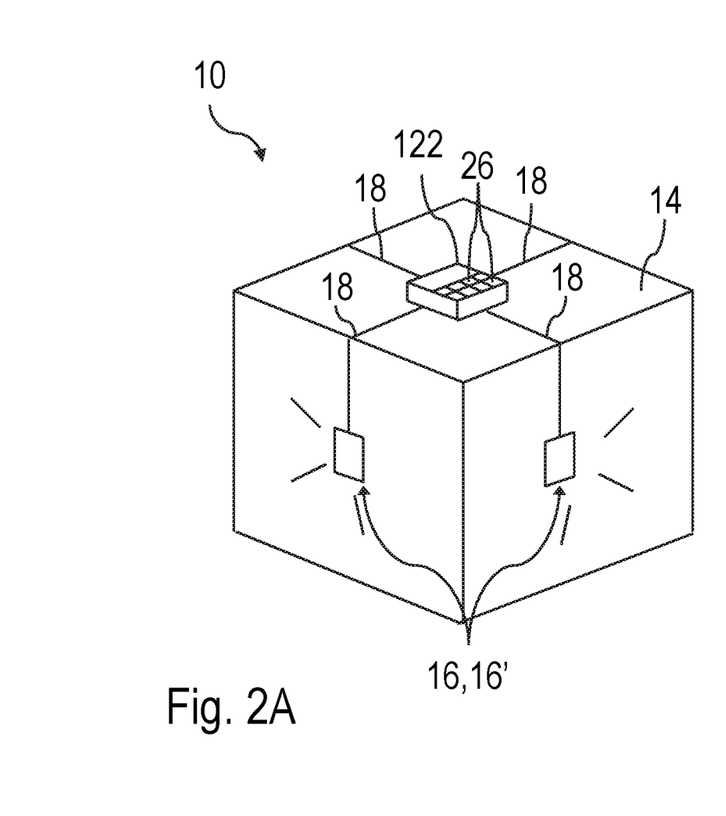
FIG. 2A is an oblique view of the gift wrapping apparatus of FIG. 1, in a wrapped configuration, with a power source including solar cells, in accordance with an embodiment.
Figure 2B:
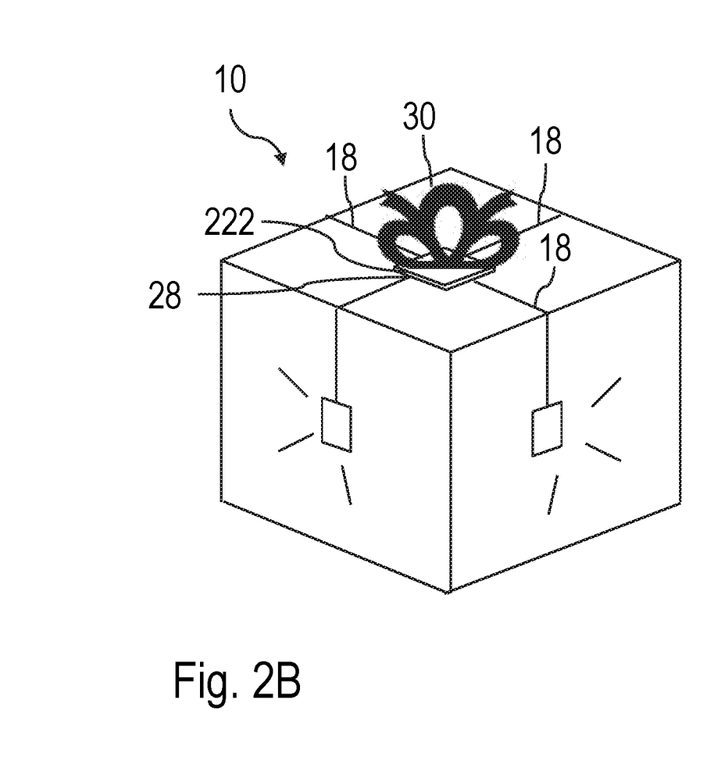
FIG. 2B is an oblique view of the gift wrapping apparatus of FIG. 1, in a wrapped configuration, with a power source including a thin battery, in accordance with an embodiment.

FIGS. 2A and 2B show the gift wrapping apparatus 10 in a wrapped and lit configuration, with different power sources 122 and 222, respectively.

In the embodiment illustrated in FIG. 2A, the power source 122 includes one or more solar cells 26. In this embodiment, the solar cells 26 are adapted to convert light into electricity and to supply power to the light emitting elements 16 via the plurality of conductive traces 18. By using the solar cells 26, the lifespan of the power source 22 can be increased as it can recharge under sunlight.

In the embodiment shown in FIG. 2B, the power source 222 includes a thin battery 28. In some embodiments, the thin battery 28 is provided in the form of an ultrathin polymer battery or the like. The thinness of the thin battery 28 can reduce the visual footprint of the power source 222 when it is connected to the conductive traces 18. In this embodiment, a decorative object 30 such as a gift bow is mounted to the power source 222 so as to decorate and/or hide the thin battery 28. Other suitable decorative objects (e.g., boxes, figurines) can be envisaged if need be. However, it will be understood that the thin battery 28 can be a printed and flexible element or attached as a rigid element.

Figure 3:
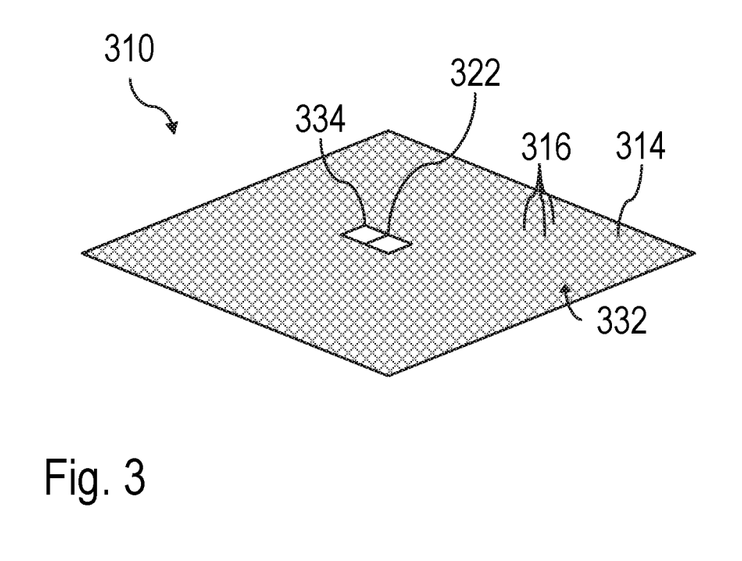
FIG. 3 is an oblique view of another example of a gift wrapping apparatus, with organic light emitting diode pixel elements distributed in a foldable display screen, in accordance with an embodiment.

FIG. 3 shows another example of a gift wrapping apparatus 310. As depicted, in this example, the gift wrapping apparatus 310 has a foldable sheet 314 of material, and OLED pixel elements 316 which are printed on a given portion of the sheet 314 and distributed in a foldable display screen 332.

In this specific embodiment, each OLED pixel element 316 of the foldable display screen 332 is configured to provide lighting in accordance with the red-green-blue (RGB) color model. The RGB color model can be described as an additive color model in which red, green and blue light are selectively added together in various ways to reproduce a broad array of colors. However, in other embodiments, the OLED pixel elements 316 may be configured otherwise.

In this specific embodiment, a power source 322 is also made integral to the sheet 314, to power the OLED pixel elements 316 via conductive traces (not shown). More specifically, the power source 322 can be printed to the sheet 314. The printable power source 322 can be provided in the form of an ultrathin polymer battery such as manufactured by Power Paper® (see http://powerpaper.cn) or by Blue Spark Technologies.

As illustrated, the gift wrapping apparatus 310 has a controller 334 which is mounted to the sheet 314 and adapted to control powering of the OLED pixel elements 316 based on powering instructions.

In this specific example, the controller 334 is made integral to the sheet 314. Specifically, the controller 334 is directly printed to the sheet 314. Accordingly, in this embodiment, both the controller 334 and the power source 322 are printed onto the sheet 314 to provide a reduced footprint to the gift wrapping apparatus 310 and/or more flexibility to the way the gift wrapping apparatus 310 can be flexed to wrap a gift. However, in some other embodiments, the controller 334 need not to be printed on the sheet. For instance, the controller can be attached in a hybrid surface mount fabrication manner to the sheet.

In this particular embodiment, the power source 322 and the controller 334 are printed in a center portion of the sheet 314 of material. However, in some other embodiments, the power source 322 and the controller 334 can be printed in a corner portion or in any other suitable portion of the sheet of material. In these embodiments, it was found convenient to group the power source 332 and the controller 334 at a single location of the sheet 314. However, the positions of the power source 322 and of the controller 334 can be different. The positions of the power source 322 and of the controller 334 can also depend on the shape and dimensions of the object to be wrapped, for instance.

Figure 4:
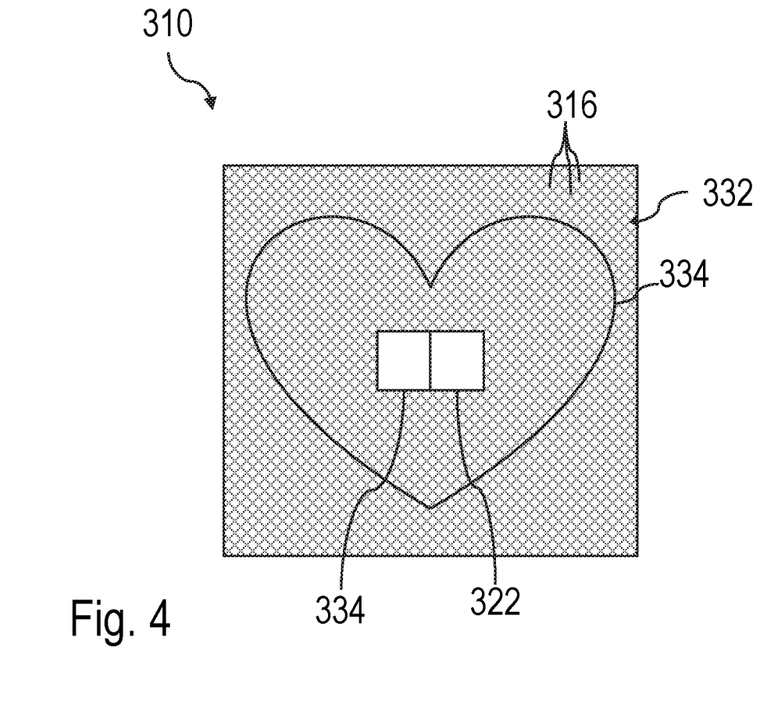
FIG. 4 is a top view of the gift wrapping apparatus of FIG. 3, showing a given pattern displayed on the foldable display screen of light emitting diode pixel elements.

It is intended that, upon receiving corresponding powering instructions, the controller 334 can cause the OLED pixel elements 316 to be lighted so as to display one or more patterns of a given color. For instance, the pattern(s) can include shape(s) such as heart(s), ribbon(s), star(s), etc. FIG. 4 shows a top view of the gift wrapping apparatus 310 when its OLED pixel elements 166 are powered so as to display a heart 334.

Figure 5A:
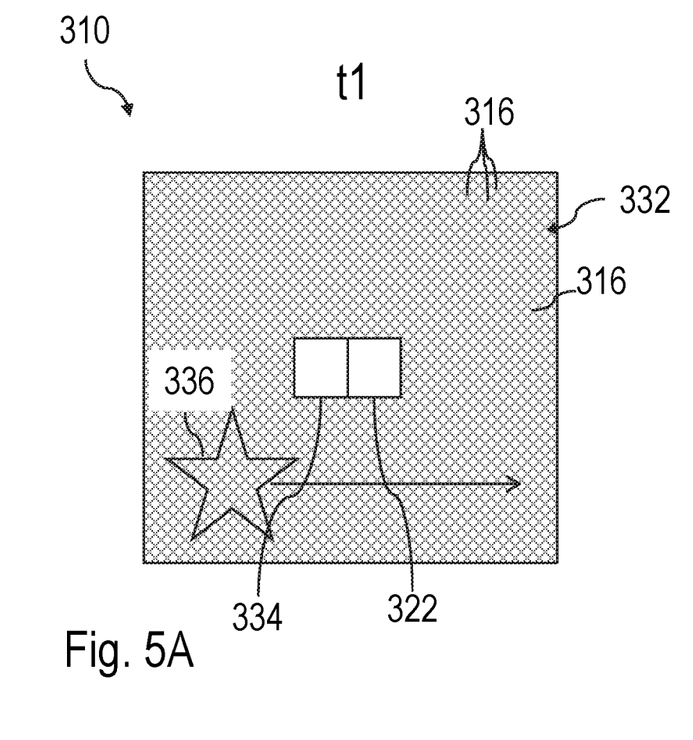
FIGS. 5A and 5B include top views of the gift wrapping apparatus of FIG. 3, showing a given pattern moving from a first position of the foldable display screen of light emitting diode pixel elements as shown in FIG. 5A to a second position of the foldable display screen as shown in FIG. 5B.
Figure 5B:
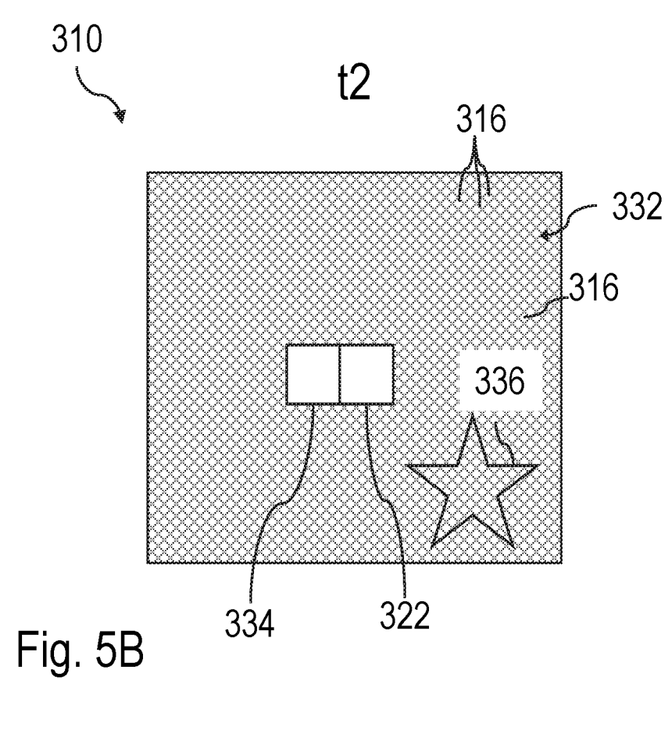

In addition, or alternately, the controller 334 can, upon receiving corresponding powering instructions, cause the OLED pixel elements 316 to be lighted so as to display one or more moving patterns. For instance, the moving pattern(s) can include one or more pattern(s) of a given color that appear, disappear, move, increase/decrease in size, increase/decrease in intensity, and/or any other suitable predetermined moving pattern. FIGS. 5A and 5B show top views of the gift wrapping apparatus 310 when its OLED pixel elements 316 are powered so as to display a star 336 moving from left to right from a first moment in time t1 to a second moment in time t2.

It is contemplated that the controller 334 can cause the color of the pattern(s) and/or moving pattern(s) referenced to above to change over time as desired upon receiving corresponding powering instructions. Moreover, the controller 334 can cause the totality of the OLED pixel elements 316 to be powered simultaneously to display one or more color at the same time.

As described above, the OLED pixel elements 316 are powered using the controller 334. In this embodiment, the controller 334 can be provided as a combination of hardware and software components. The hardware components can be implemented in the form of a hardware device 440, an example of which is described with reference to FIG. 6. Moreover, the software components of the controller 334 can be implemented in the form of a controller application 750, an example of which is described with reference to FIG. 8.

Figure 6:
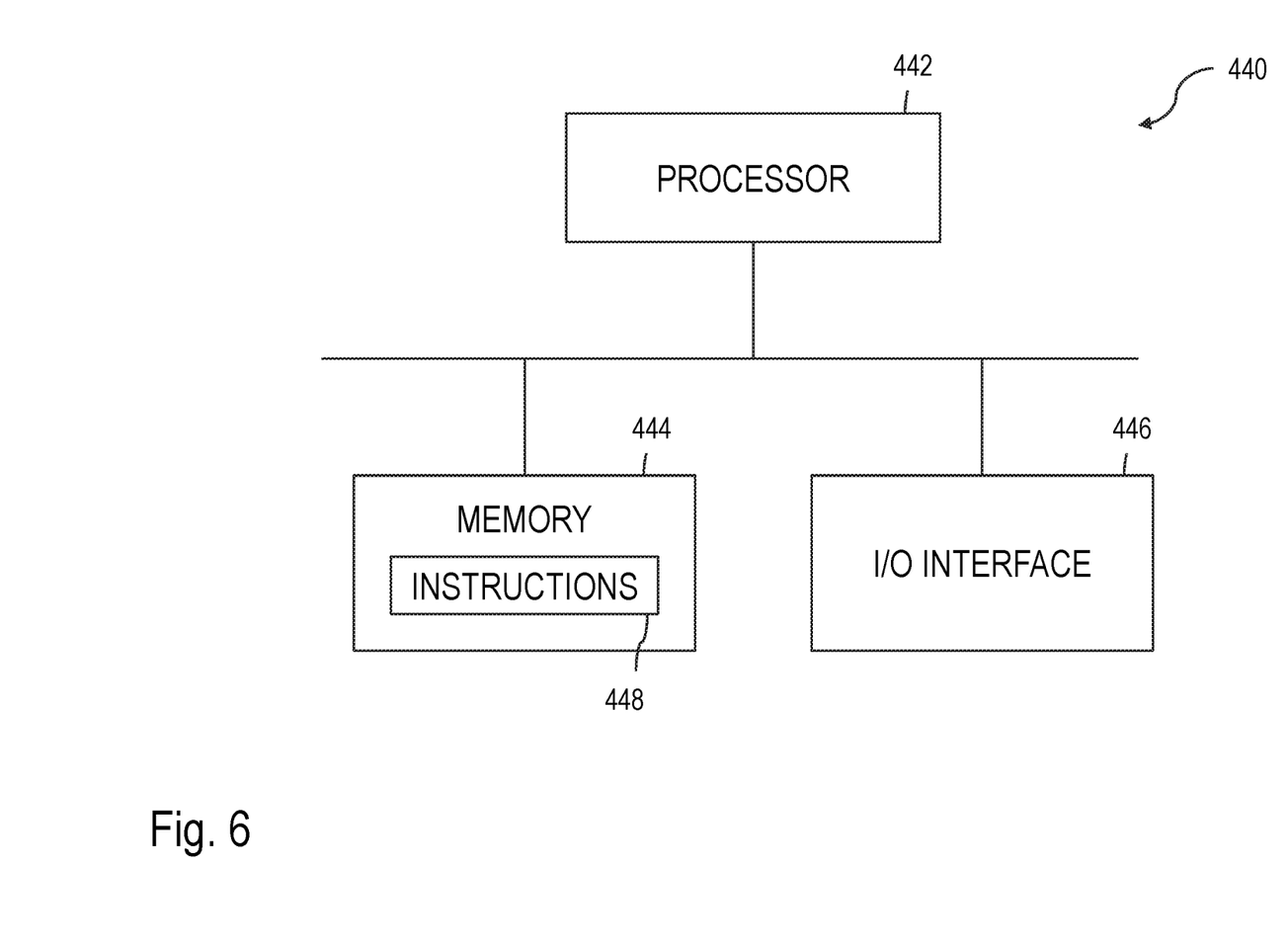
FIG. 6 is a schematic view of an example of a hardware device of a controller of the gift wrapping apparatus of FIG. 3.

Referring to FIG. 6, the hardware device 440 can have a processor 442, a memory 444, and an I/O interface 446. Instructions 448 for controlling the powering of the OLED pixel elements 316 can be stored on the memory 444 and accessible by the processor 442.

The processor 442 can be, for example, a general-purpose microprocessor or microcontroller, a digital signal processing (DSP) processor, an integrated circuit, a field programmable gate array (FPGA), a reconfigurable processor, a programmable read-only memory (PROM), or any combination thereof.

The memory 444 can include a suitable combination of any type of computer-readable memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

Each I/O interface 446 enables the hardware device 440 to interconnect with one or more input devices, such as an actuator, a wireless communication unit and/or an external mobile device, or with one or more output devices such as the OLED pixel elements 316.

Each I/O interface 446 enables the controller 334 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. W-Fi, WMAX), SS7 signaling network, fixed line, local area network, wide area network, and others, including any combination of these.

Figure 7A:
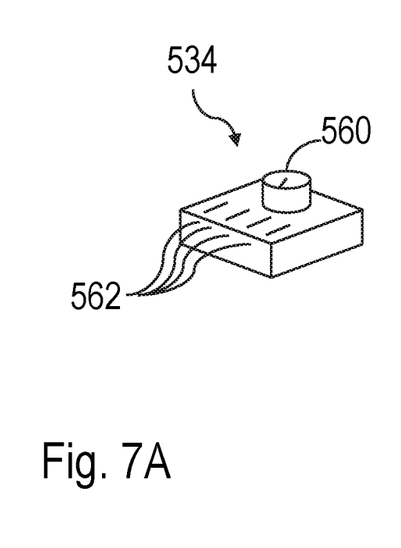
FIG. 7A shows an example of the hardware device of FIG. 6, shown with an actuator, in accordance with an embodiment.

FIG. 7A shows an example of a hardware device 534. In this embodiment, the hardware device 534 includes an actuator 560 which can be set to one of a plurality of positions 562 indicative of the powering instructions to be executed by the hardware device 534. For instance, in this case, the actuator 560 is a rotatable knob which can be set to either one of four positions 562. For instance, the first position can be indicative of powering instructions to display a heart, the second position can be indicative of powering instructions to display a star, and so forth. Accordingly, the hardware device can retrieve the powering instructions associated to a selected one of the positions 562, and power the OLED pixel elements 316 accordingly.

Figure 7B:
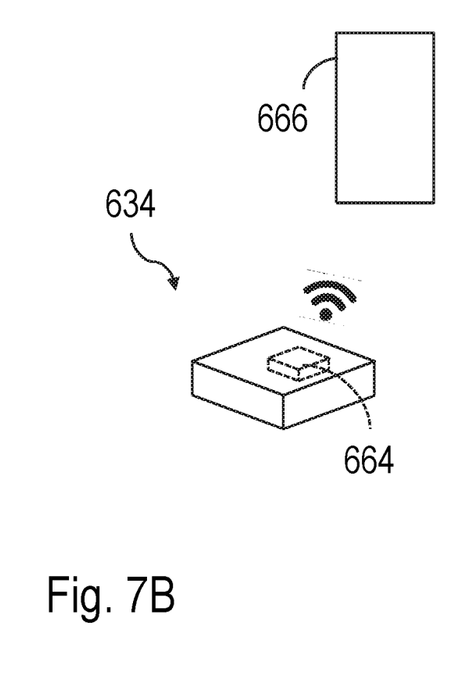
FIG. 7B shows another example of the hardware device of FIG. 6, shown with a wireless communication unit communicatively coupled to an external mobile device, in accordance with an embodiment.

FIG. 7B shows another example of a hardware device 634. In this specific embodiment, the hardware device 634 includes a wireless communication unit 664 configured to receive, from an external electronic device 666 (e.g., a smartphone, a tablet, a laptop computer), data indicative of the powering instructions to be executed by the hardware device 634. Upon receiving such data, the hardware device 634 can retrieve the powering instructions associated to the data and power the OLED pixel elements 316 accordingly. Examples of wireless communication schemes can include RF-based communication, Wi-Fi, Bluetooth and the like. Accordingly, the wireless communication unit 664 can be a radio-frequency identification (RFID) chip attached to a printed RF antenna using surface mount hybrid fabrication methods.

Figure 8:
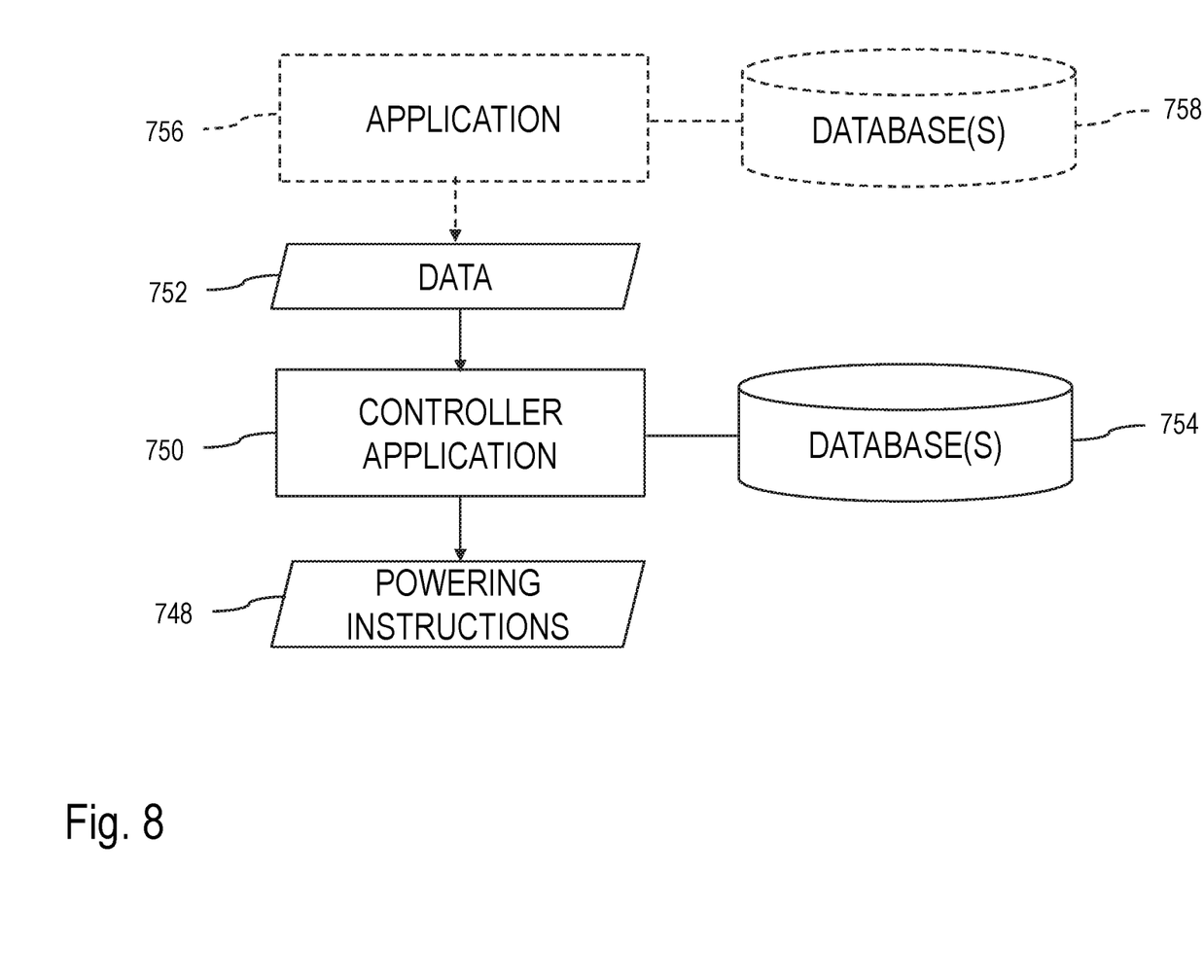
FIG. 8 is a schematic view of an example of a controller application of the controller of the gift wrapping apparatus of FIG. 3.

Referring now to FIG. 8, the controller application 750 is configured to receive data 752 being indicative of the powering instructions 748 and to determine the powering instructions 748 upon processing the data 752. In some embodiments, the controller application 750 is stored on the memory 444 and accessible by the processor 442 of the hardware device 440.

The hardware device 440 and the controller application 750 described above are meant to be examples only. Other suitable embodiments of the controller 334 can also be provided, as it will be apparent to the skilled reader.

As can be understood, the powering instructions 748 include one or more instructions for powering on and/or off the OLED pixel elements 316 of the gift wrapping apparatus 110. Accordingly, the controller application 750 can act as a switch.

In alternate embodiments, the powering instructions 748 can also be used to power each one of the OLED pixel elements 316 in a given manner to display given pattern(s) or moving pattern(s).

Based on the powering instructions 748, the controller application 750 can instruct the hardware device 440 to power the OLED pixel elements 316 in the instructed manner to generate the desired pattern(s) or moving pattern(s).

In some embodiments, the received data 752 correspond to the powering instructions 748. In these embodiments, the determination of the powering instructions 748 requires minimal processing of the data 752.

In some other embodiments, the received data 752 are only indicative of the powering instructions, and processing is required to determine the powering instructions 748 from the received data 752. In such embodiments, one or more databases 754 stored on the memory 444 of the hardware device 440 are accessible to the controller application 750 for use in processing the data 752.

In these embodiments, the received data 752 may correspond to a pattern identifier, in which case the database 754 can comprise pre-programmed powering instructions 748 associated to various pattern identifiers. For instance, the pattern identifier can be "S1" (meaning "star of a first size"), in which case corresponding powering instructions 758 can be retrieved by the controller application 750 from the database 754, and transmitted to the hardware device 440 for execution in order to display a star of the first size, for instance.

In alternate embodiments, an application 756 which is stored on a memory of the external electronic device 666 and accessible thereby can transmit the data 752 to the controller application of the gift wrapping apparatus 10. In these embodiments, the application 756 may have access to a plurality of patterns and/or moving patterns which are stored on one or more databases 758 accessible by the external mobile device. In this case, the external mobile device may display a choice of pattern(s) and/or moving pattern(s), from which a selection can be made. Upon selecting one of the pattern(s) and/or moving pattern(s), data indicative of the selection can be transmitted, e.g., in a wireless manner, to the controller 334 so that the OLED pixel elements of the corresponding wrapping apparatus display the selected pattern.

In further embodiments, the application 756 may allow designing one or more patterns and/or moving patterns, and storing these customized patterns and/or moving patterns. For instance, the application 756 may let prompt a pop-up box in which a string, e.g., "Happy birthday John!", can be inputted by the user, for display on the gift wrapping apparatus when desired. As it can be understood, this optional feature is an example only. Customized patterns and/or moving patterns can include customized shapes, pictures imported from a memory of the external mobile device, and the like.

Figure 9:
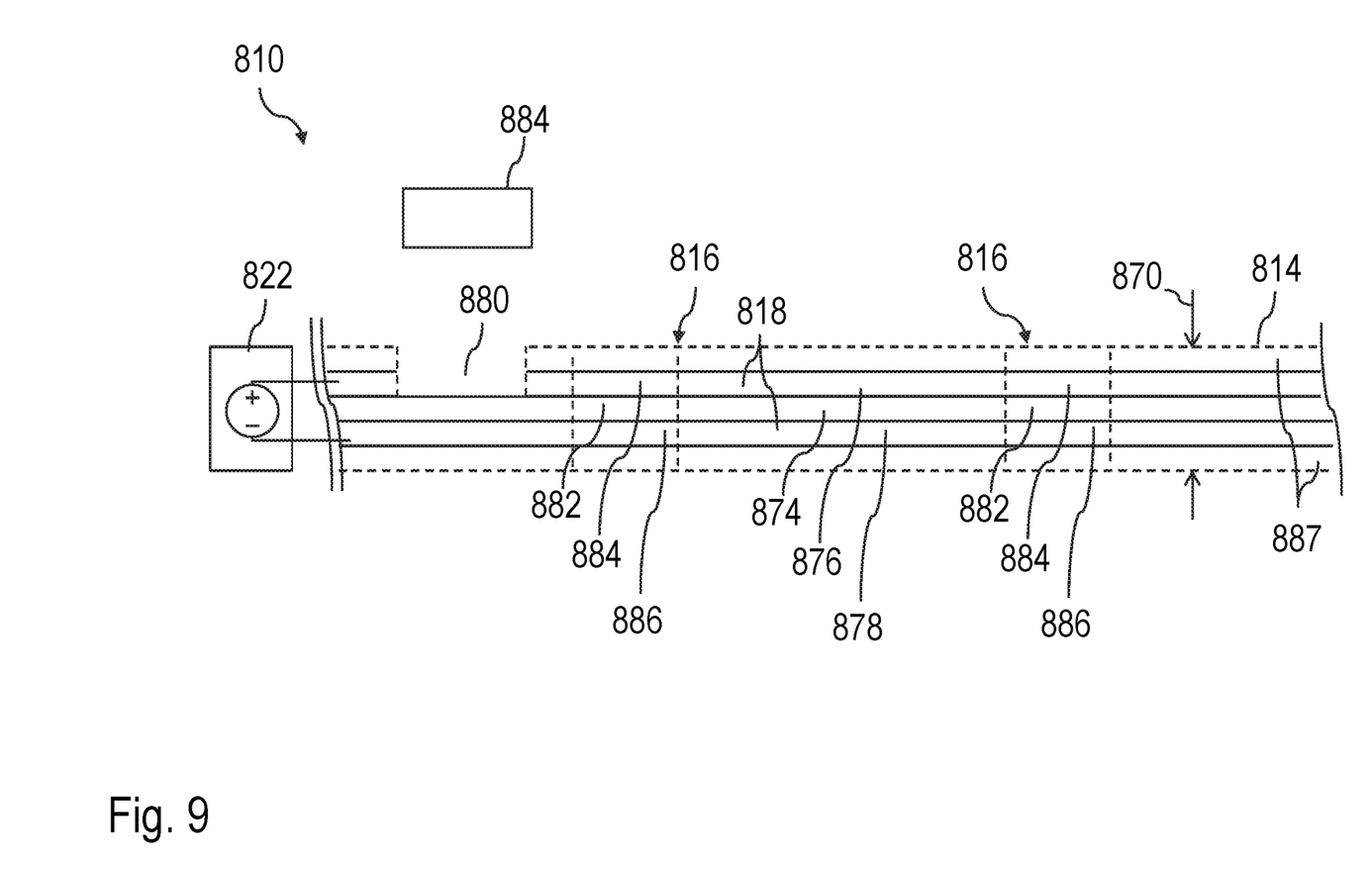
FIG. 9 is a side view of another example of a gift wrapping apparatus, showing organic light emitting diode pixel elements being distributed across a thickness of the gift wrapping apparatus, in accordance with an embodiment.

FIG. 9 is a side view of another example of a gift wrapping apparatus 810. As depicted, in this example, the gift wrapping apparatus 810 has a foldable sheet 814 of material and OLED pixel elements 816 which are printed on a given portion of the sheet 814.

As shown, the OLED pixel elements 816 are distributed across a thickness 870 of the sheet 814. More specifically, in this embodiment, the sheet 814 has a multitude of superposed layers, including a first layer 874 sandwiched between a second layer 876 and a third layer 878.

In this embodiment, each OLED pixel element 816 has an emissive electroluminescent portion 882 in the first layer 874 of the sheet 814, a first conductor portion 884 in the second layer 876 and a second conductor portion 886 in the third layer 878 of the sheet 814.

In this embodiment, the second layer 876 and the third layer 878 are conductive traces 818 which are used to conduct power from the power source 822 to the OLED pixel elements 816.

In this specific embodiment, one of the conductive traces 818 has a discontinuity 880 which opens the electrical circuit including the power source 822, the conductive traces 818 and the OLED pixel elements 816. In this embodiment, the discontinuity 880 allows turning the power between an on state and an off state. For instance, a conductive member 884 (e.g., a conductive tape) may be placed at the discontinuity 880 so as to close the electrical circuit, and allow the powering of the OLED pixel elements 816. It is envisaged that in some other embodiments, any other suitable types of switching mechanisms can be used. For instance, the conductive member 884 can be provided as a flap of the sheet 814 of material so that the flap can be selectively folded towards the sheet 814 to close the circuit and allow powering of the OLED pixel elements 816.

Protective and/or decorative layers 887 can be provided to protect the first, second and third layers 874, 876 and 878.

In some other embodiments, when the OLED pixel elements 816 are connected in series, the conductive traces 818 may include one or more bypass loops which permit to close the electrical circuit when some portion of the sheet 814 is cut away. These bypass loops may be provided at different distances from the power source 822 so that when one or more portions of the sheet 814 are cut at the periphery thereof, at least some of the bypass loops can allow the remaining OLED pixel elements 816 to be powered appropriately.

As can be understood, any one of the gift wrapping apparatuses described above can be used by i) wrapping a gift, and by ii) powering the powering circuit thereof thereby turning on at least some of the plurality of light emitting elements. In some embodiments, the step of powering the powering circuit can include connecting a power source to terminals of the powering circuit. In some other embodiments, the step of powering the powering circuit can include controlling the powering of the light emitting diodes in a manner that the light emitting diodes display at least one of a pattern and a moving pattern.

In it envisaged that any one or all of the gift wrapping apparatuses described above can be fabricated by printing a plurality of light emitting elements onto a sheet of material being foldable by hand in which the plurality of light emitting elements having power receiving conductors, and by printing a plurality of conductive traces so as to form a powering circuit connecting the power receiving conductors of the plurality of light emitting elements to at least a positive terminal and a negative terminal. As can be understood, the fabrication can include a step of printing a power source onto the sheet so as to supply power to the powering circuit. The fabrication can also include a step of printing a controller onto the sheet so as to control the powering of the powering circuit. However, it will be understood that the power source and controller can be made of rigid silicon elements attached using a surface mount hybrid fabrication method to the wrapping apparatus.

As can be understood, the examples described above and illustrated are intended to be exemplary only. For instance, in some embodiments, the gift wrapping apparatus may be stretchable in addition to being foldable. In alternate embodiments, the gift wrapping apparatus includes more than one powering circuits which can be connected to respective power sources. The scope is indicated by the appended claims.

What is claimed is:

1. A gift wrapping apparatus comprising:
   a sheet of material being foldable by hand;
   a plurality of light emitting elements made integral to the sheet, the plurality of light emitting elements having power receiving conductors; and
   a plurality of conductive traces made integral to the sheet and forming a powering circuit connecting the power receiving conductors of the light emitting elements to at least a positive terminal and a negative terminal.

2. The gift wrapping apparatus of claim 1 wherein the light emitting elements are organic light emitting diode (OLED) elements.

3. The gift wrapping apparatus of claim 2 wherein the OLED elements are OLED pixel elements distributed in a foldable display screen.

4. The gift wrapping apparatus of claim 1 further comprising a power source made integral to the sheet and adapted to supply power to the powering circuit.

5. The gift wrapping apparatus of claim 1 further comprising a power source being removably connected to the positive terminal and the negative terminal and adapted to supply power to the powering circuit.

6. The gift wrapping apparatus of claim 5 further comprising a decorative object mounted on the power source.

7. The gift wrapping apparatus of claim 5 wherein the power source has at least one solar cell being adapted to convert light into electricity and to supply power to the powering circuit.

8. The gift wrapping apparatus of claim 1 further comprising a controller being made integral to the sheet and adapted to control powering of the plurality of light emitting elements based on powering instructions.

9. The gift wrapping apparatus of claim 8 wherein the powering instructions are pre-programmed instructions stored on a memory of the controller.

10. The gift wrapping apparatus of claim 8 wherein the controller comprises a wireless unit configured to receive data concerning the powering instructions from an external electronic device, the controller powering the plurality of light emitting elements upon processing the received data.

11. The gift wrapping apparatus of claim 1 further comprising a switching mechanism made integral to the sheet and allowing selective powering of the plurality of light emitting elements when the switching mechanism is activated.

12. The gift wrapping apparatus of claim 1 wherein the plurality of conductive traces includes one or more bypass loops when at least some of the plurality of light emitting elements are connected in series to one another in the powering circuit.

13. The gift wrapping apparatus of claim 1 wherein the light emitting elements are distributed across a thickness of the sheet.

14. The gift wrapping apparatus of claim 13 wherein the sheet comprises a plurality of superposed layers including a first layer sandwiched between a second layer and a third layer, the light emitting elements comprising an emissive electroluminescent portion in the first layer of the sheet, a first conductor portion in the second layer and a second conductor portion in the third layer of the sheet.

15. The gift wrapping apparatus of claim 14 wherein the plurality of superposed layers includes protective layers protecting other ones of the superposed layers.

16. A method of using a gift wrapping apparatus having a sheet of material being foldable by hand, a plurality of light emitting elements made integral to the sheet, and a powering circuit allowing powering the plurality of light emitting elements, the method comprising:
wrapping a gift with the gift wrapping apparatus; and
powering the powering circuit thereby turning on at least some of the plurality of light emitting elements.

17. The method of claim 16 wherein said powering includes connecting a power source to terminals of the powering circuit.

18. The method of claim 16 wherein said powering includes controlling the powering of the plurality of light emitting diodes in a manner that the plurality of light emitting diodes display at least one of a pattern and a moving pattern.

19. A method of fabricating a gift wrapping apparatus, the method comprising:
printing a plurality of light emitting elements onto a sheet of material being foldable by hand, the plurality of light emitting elements having power receiving conductors;
printing a plurality of conductive traces so as to form a powering circuit connecting the power receiving conductors of the plurality of light emitting elements to at least a positive terminal and a negative terminal.

20. The method of claim 19 further comprising printing a power source onto the sheet, the power source being adapted to supply power to the powering circuit.

* * * * *